United States Patent [19]
Muntzer et al.

[11] Patent Number: 5,919,573
[45] Date of Patent: Jul. 6, 1999

[54] METHOD FOR COATING CARRIERS, EMULSION USED THEREIN, RESULTING COATED MATERIALS, AND DEVICES FOR PRODUCING AND LAYING COATED MATERIALS

[76] Inventors: Emile Jacques Muntzer; Paul Emile Muntzer, both of 24 avenue du Général de Gaulle, 67000 Strasbourg; Jean Muntzer, 14b rue Neuve, 67300 Schiltigheim; Isabelle Muntzer, 10 rue St Jean, 69005 Lyon, all of France

[21] Appl. No.: 08/860,096

[22] PCT Filed: Jan. 3, 1996

[86] PCT No.: PCT/FR96/00010

§ 371 Date: Sep. 2, 1997

§ 102(e) Date: Sep. 2, 1997

[87] PCT Pub. No.: WO96/21686

PCT Pub. Date: Jul. 18, 1996

[30] Foreign Application Priority Data

Jan. 3, 1995 [FR] France .................................. 95 00079
Mar. 29, 1995 [FR] France .................................. 95 03918

[51] Int. Cl.$^6$ .............................. B05D 7/00; C08J 95/00; B32B 11/00
[52] U.S. Cl. ...................... 428/489; 427/212; 427/213.3; 427/372.2; 427/215; 427/138; 106/27 A; 106/38.24; 106/38.25; 106/502; 106/277
[58] Field of Search ................................. 427/212, 213.3, 427/372.2, 138, 215; 106/27 A, 38.24, 38.25, 477, 502, 277; 118/58, 608, 610; 366/177.1, 180.1, 181.1, 181.2, 181.3, 191; 428/489

[56] References Cited

U.S. PATENT DOCUMENTS 3,418,900  12/1968  Bray et al. .
3,740,027   6/1973  Kormos ...................................... 259/69
3,932,331   1/1976  Doi et al. .................................... 260/28
4,245,915   1/1981  Bracegirdle ............................... 366/12
4,423,088  12/1983  Graf et al. ................................ 427/138
4,462,840   7/1984  Schilling et al. ........................ 106/277
4,619,550  10/1986  Jeppson ..................................... 404/80
4,804,563   2/1989  Hillemeier et al. .................. 427/397.7
4,946,711   8/1990  Hawker et al. .......................... 427/156
5,116,420   5/1992  Schneider et al. ...................... 106/640
5,173,115  12/1992  Glynn, Jr. et al. ................... 106/281.1
5,223,031   6/1993  Sugi et al. .............................. 106/277
5,470,146  11/1995  Hawkins ................................... 366/25

FOREIGN PATENT DOCUMENTS 0 275 461   7/1988  European Pat. Off. .
0 402 292  12/1990  European Pat. Off. .
0 555 167   8/1993  European Pat. Off. .
810 494     3/1937  France .
867 054     9/1941  France .
1 595 858   7/1970  France .
1 594 815   8/1970  Germany .
30 18 419  11/1981  Germany .
996 274     6/1965  United Kingdom .
1 340 762  12/1973  United Kingdom .

*Primary Examiner*—Shrive Beck
*Assistant Examiner*—Michael Barr
*Attorney, Agent, or Firm*—Young & Thompson

[57] ABSTRACT

A process for the bituminous coating of any supports by providing a cold coating of the supports by bituminous emulsions, comprising first obtaining a hydrophobic powder of positive electric charge by the conjoint action of a metallic salt soluble in water and a long chain organic acid, then introducing this powder, either into a mass of the supports to be coated, or into a bituminous anionic emulsion and then mixing the supports and bituminous emulsion in a mixer so as to effect cold coating. An anionic emulsion is mixed with a hydrophobic powder of positive electric charge so as to confer on the emulsion a cationic behavior and coating and covering properties.

13 Claims, 5 Drawing Sheets

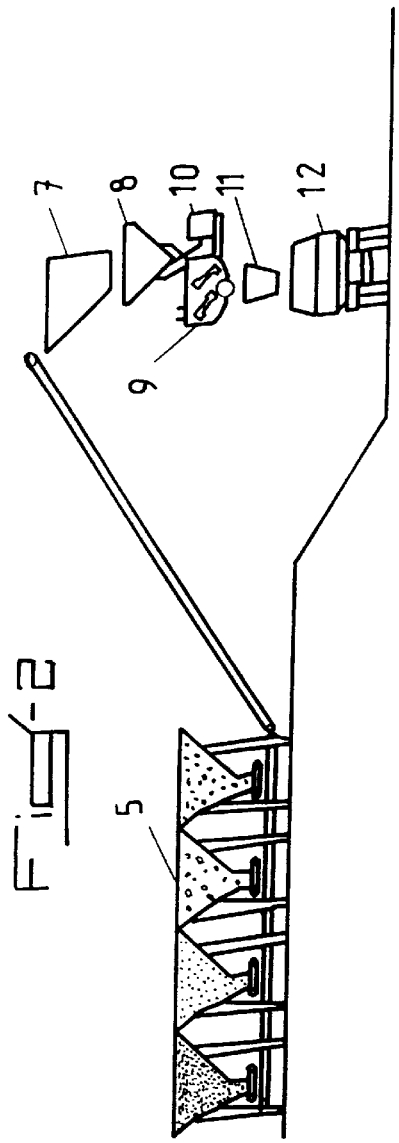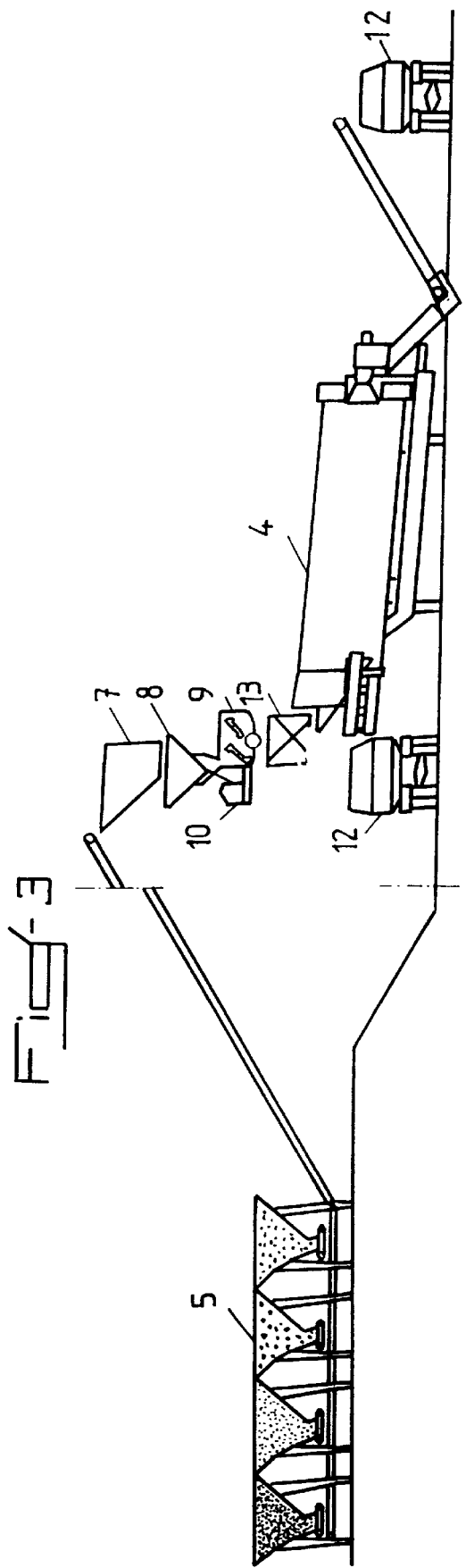

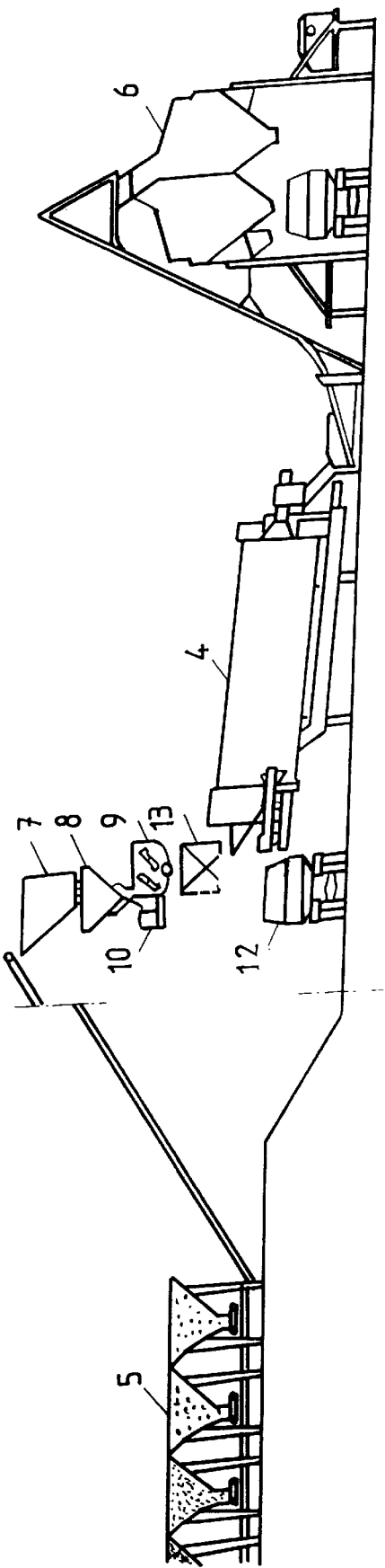

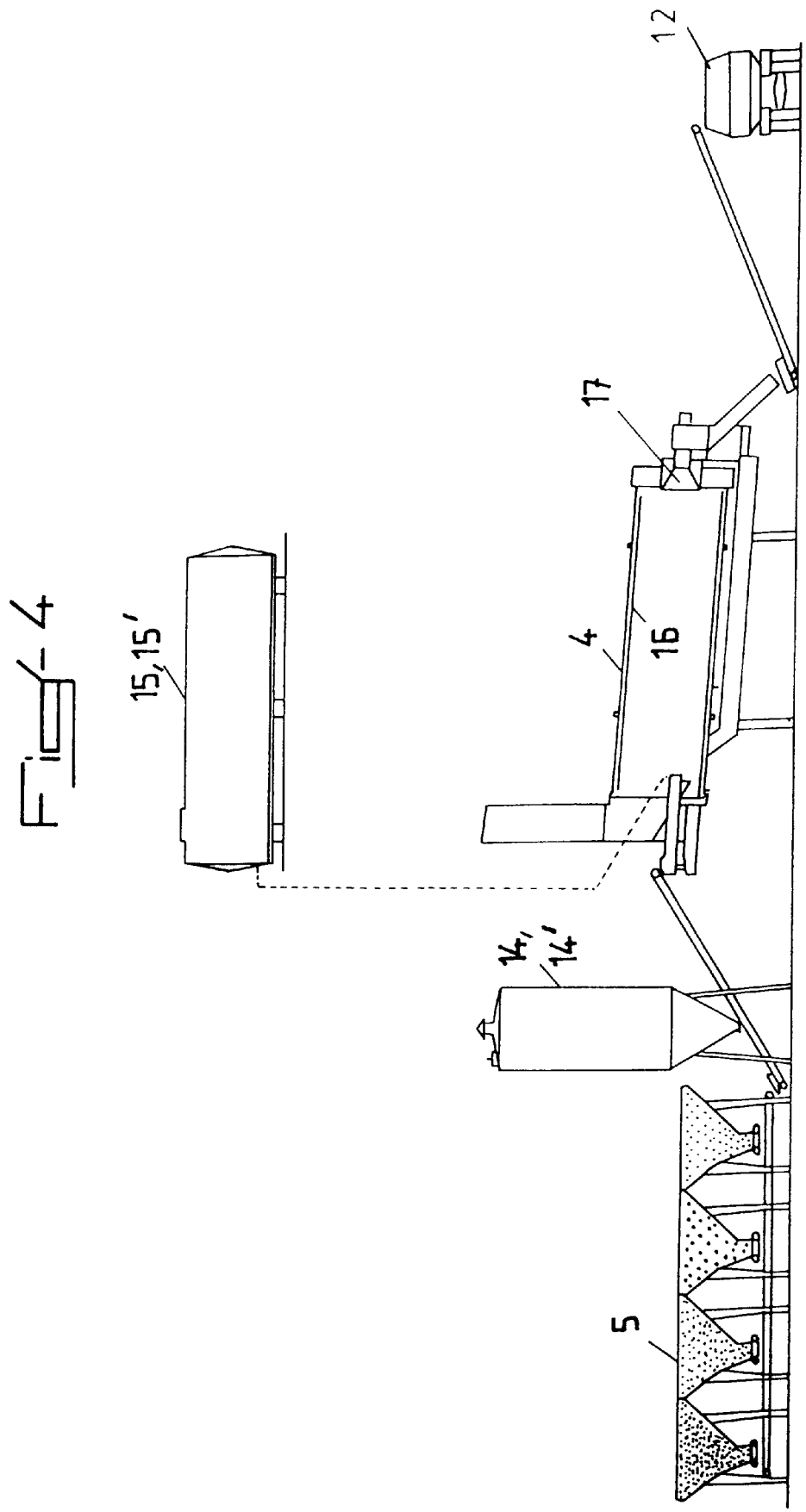

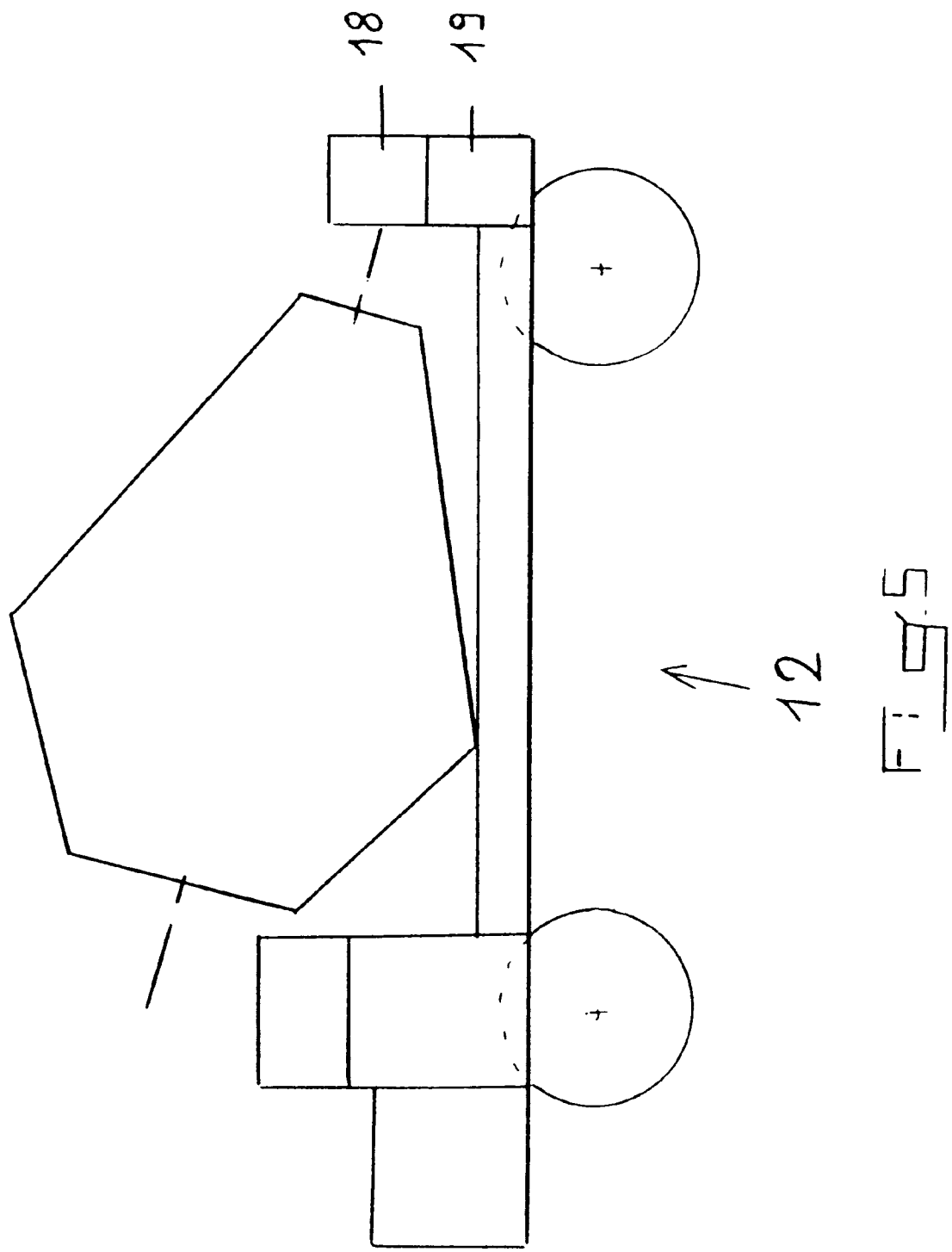

METHOD FOR COATING CARRIERS, EMULSION USED THEREIN, RESULTING COATED MATERIALS, AND DEVICES FOR PRODUCING AND LAYING COATED MATERIALS

FIELD OF THE INVENTION

The present invention relates to the field of coating and emulsions, particularly bituminous emulsions, coated materials obtained by use of these emulsions, as well as devices for the production and laying of bituminous coated materials.

It has more particularly for its object a process for coating of any kind of supports, as well as devices or installations for the production and laying of such coated materials.

It also has for its object a process for the preparation of an emulsion, particularly of the bituminous type, emulsions obtained by this process and having a universal and versatile covering and coating capacity, no matter what the type of support to be coated or to be covered, and a cold coated material obtained by the application of such a bituminous emulsion, as well as means ultimately to render transportable and windable such a coated material.

BACKGROUND OF THE INVENTION

The problem of coating and of covering supports that have not been pretreated and are often wet, rises particularly in respect to bituminous emulsions which must adhesively coat granular and filamentary compositions, taken as they come, on their deposits in the open.

It is a fact that wet materials do not accept in this condition coating with hydrocarbons. The water being in effect the principal occupant, it has until now been necessary either to dry the materials or to displace the water chemically.

A first solution satisfying these problems has been proposed by French patent application 2686811 and European patent application 0 555 167, useful both for hot coating and for cold coating.

The process described in these applications comprises rendering hydrophobic the supports to be coated, by cold pretreatment, by causing to react, in contact with these supports, two hydrophobic vectors, namely: a metallic salt and a fatty acid or similar products. When these latter are mixed with dry or low humidity supports, the hydrophobic nature appears spontaneously, without drying. Moistened with more than 1% water, the support materials, particularly the filamentary ones, must be dried after having added and mixed the hydrophobic vectors, which is also the case for the open granulometry materials. This drying must be carried out cold, hence without the use of a drying drum.

The mineral granulates thus pretreated can be adhesively coated with any bituminous binder, no matter what its form.

OBJECTS OF THE INVENTION

The present invention has for its first object to provide a coating process for any type of support securing the coating cold and a device to carry out particularly this coating process, permitting using to the maximum the elements of the installation and the conventional hot coating materials, while omitting certain of the devices of these latter and thereby rendering the remaining devices more versatile.

Another object of the invention consists in providing an emulsion, bituminous or not, having versatile and universal covering and coating properties, no matter what the nature or type of the support, pretreated or not, and adapted to be obtained in a simple manner, which will not be trouble-some or polluting.

The present invention also has for its object to provide a device permitting producing cold coated materials by utilizing the emulsion produced by the mentioned process.

SUMMARY OF THE INVENTION

To this end, the invention has for its first object a process for the bituminous coating of no matter what support, characterized in that it consists in providing a cold coating of the supports by one or more emulsions with an adhesive rupture, complete or not, obtained in the mixers or the like, then in reheating the coated materials obtained, for example in a reheater, to a sufficient temperature permitting their transportation and their laying at about 100° C., without having to evaporate the water.

The present invention also relates to a process for the preparation of an emulsion having improved coating and covering properties, as well as an emulsion obtained by this process, this latter being characterized in that it consists in introducing into an anionic emulsion, finished or in the course of production, at least one hydrophobic mineral or organic powder of positive electrical charge and very finely divided, in a quantity at least sufficient to confer on said emulsion a cationic behavior and versatile coating properties.

The invention also has for its object a device for the production and laying of bituminous coated materials, obtained particularly by using the emulsion obtained above, characterized in that it is principally constituted by metering silos containing granulates to be coated, hydrophobic or not, and having different granulometries, by a temporary storage silo fed by the metering silos with a mixture of granulates determined as a function of a given granular formulation, by a balance receiving the successive charges from the silo, by at least a mixer supplied by the balance and by a metering pump connected to a storage receptacle for the bituminous anionic emulsion, mixed or not with a hydrophobic powder, this as a function of the nature of the granulates and/or of the presence or not of hydrophobic powder in these latter, and by a pouring conduit that pours the coated materials into the container of at least one transport means.

Moreover, the invention has for its object a device for the production and laying of bituminous coated materials, permitting particularly the use of the mentioned coating process, characterized in that it comprises selective feed means for hydrophobic and non-hydrophobic granulates, in bituminous anionic emulsion and in bituminous anionic emulsion having added hydrophobic powder, from corresponding storage contents, at least one mixing means performing the coating, followed by or combined with reheating means for the coated materials, and a means to supply and pour the coated materials, heated or not, into the container of a transport means.

BRIEF DESCRIPTION OF THE DRAWINGS

The invention will be better understood from the description which follows, which concerns preferred embodiments, given by way of non-limiting examples, and explained with reference to the accompanying schematic drawings, in which:

FIG. 2 is a schematic view of a device for production and laying of cold coated materials according to the invention;

FIG. 3 is a schematic view of a device for the production and laying of cold and hot coated materials according to the invention;

FIG. 3A is a schematic view of a modified embodiment of the device shown in FIG. 3;

FIG. 4 is a schematic presentation of a device for the production and laying of hot and cold coated materials according to another embodiment of the invention, and, FIG. 5 is a schematic view of a transport means provided with a pouring unit according to the invention.

DETAILED DESCRIPTION OF THE INVENTION

Figure 1:
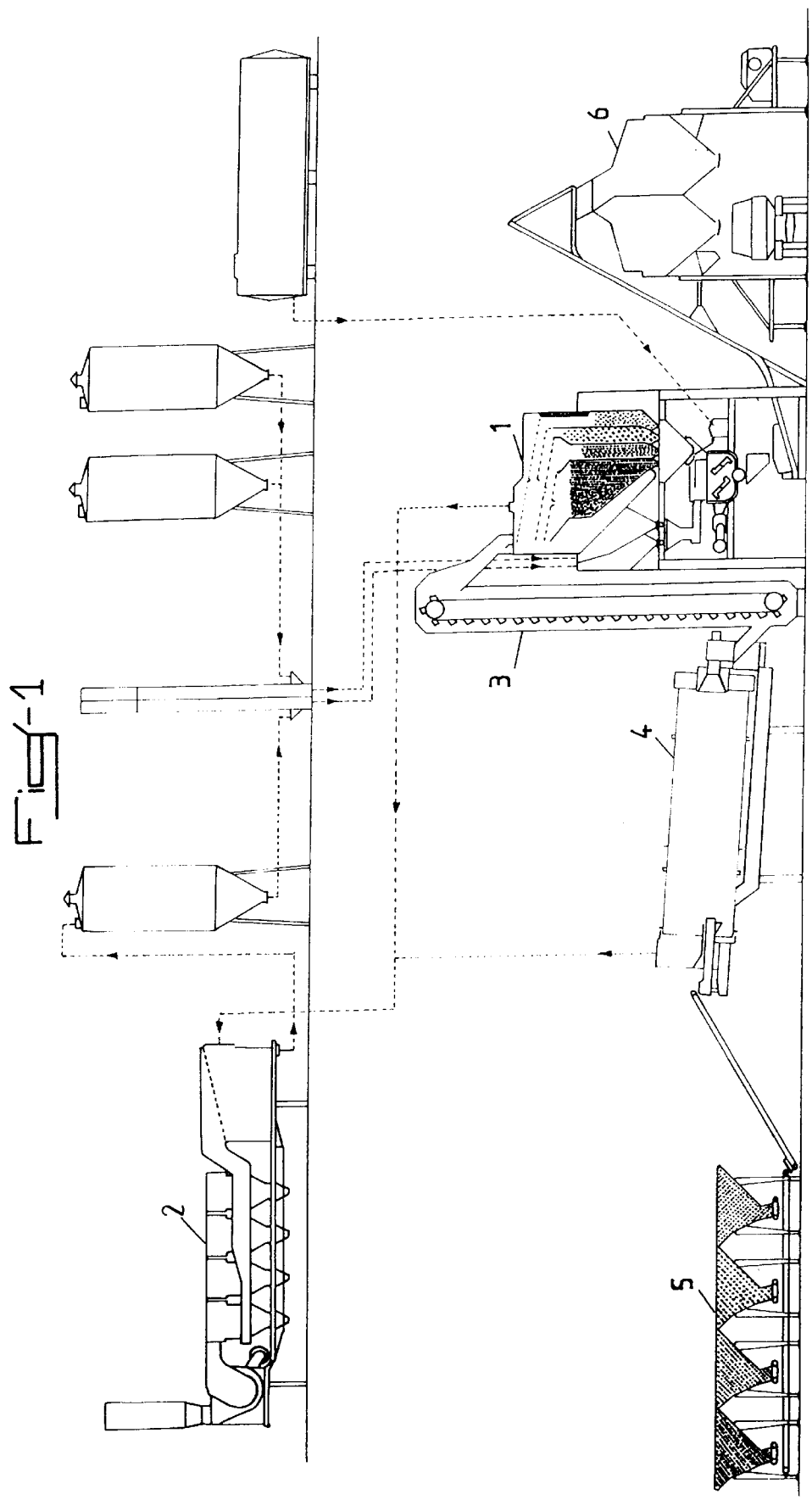
FIG. 1 is a schematic view of an installation for the production of conventional hot coated materials forming a part of the state of the art.

According to the invention, the coating process for any type of support consists in providing a cold coating on the supports with adhesive rupture, complete or not, obtained in mixers or the like, then in reheating the obtained coated materials, for example in a reheater, to a sufficient temperature permitting their transport and their laying at about 100° C., without trying to evaporate the water.

According to a first characteristic of the invention, there can first be obtained a finely divided hydrophobic powder of positive electrical charge, by the concomitant action of a metallic salt solution in water and a long chain organic acid, then introducing this powder, either into the mass of the supports, particularly the granulates, to be coated, or into the bituminous anionic emulsion, and then mixing the granulates and the bituminous emulsion in a mixer or the like so as to carry out cold coating.

Because of the hydrophobic techniques, the water of rupture or combined water by the granulates does not need to be evaporated and can be used with the bitumen having bonded the fines, to avoid segregation as well as pollution by the powder and vapors of bituminous distillation, often overheated during conventional hot coating.

More precisely, it can be provided according to an embodiment of the invention, to mix an anionic emulsion with a hydrophobic mineral or organic powder of positive electric charge, very finely divided, so as to confer on said emulsion a cationic behavior and universal covering and coating properties.

According to a modified embodiment of the invention, applicable to the case of coating with the aid of superstabilized anionic emulsions, the rupture, the adhesion and the covering are regulated, in an adjustable manner, by a mixture of hydrophobic powder and of breaking vector, this mixer being adapted to be added to the coated material at the time of its laying, either in the form of an aqueous suspension, particularly colloidal, or in the form of solid powder, comprised by the mixture of the hydrophobic powder and of the breaking vector in the form of its salt.

Preferably, the alkaline medium of the emulsion is carried to a stabilizing level such that the hydrophobic powder, metering in a just sufficient manner, will not trigger a substantial breaking of said emulsion, and in that a substance causing the breaking of the emulsion is added to the coated material at the time of laying this latter, said breaking being able to take place, for example, by precipitation of the anionic emulsifier by magnesium sulfate or a similar substance.

The present invention also has for its object the preparation of an emulsion, permitting carrying out the cold coating of any type of support, this emulsion being particularly adapted for the cold coating mentioned above in the framework of the mentioned coating process.

The preparation of such an emulsion, having improved covering and coating properties, consists essentially in introducing into a finished anionic emulsion or one in the course of production, at least one hydrophobic organic or mineral powder of positive electrical charge and very finely divided, in a quantity at least sufficient to confer on said emulsion a cationic behavior and versatile coating properties.

Preferably, the hydrophobicity and the positive electric charge of the grains of the powder are obtained, prior to its introduction into the emulsion, by the concomitant action of a metallic salt and a long chain organic acid.

According to a preferred embodiment, the metallic salt can consist of a ferrous salt or of a metallic acid salt, in aqueous solution, the organic acid being adapted to consist of a fatty acid.

The technical details for obtaining this type of hydrophobicity are described in a more particular manner in The French and European applications mentioned above.

The mineral and organic powders used are preferably of a very fine grain, as for example clays such as bentonite, talc or the like or powders such as calcium carbonate, sold under the designation Spanish white, or the like.

In spite of their fineness, which can be colloidal, these powders can be hydrophobic without particular drying operations.

Preferably, the mean diameter of the grains of the hydrophobic powder is at least about ten times less than that of the globules in suspension in the emulsion.

According to one characteristic of the invention, and to permit in all cases the introduction of the hydrophobic powders mentioned, into the emulsions to be transformed, each emulsion in question is present initially in the form of an anionic emulsion stabilized by means of one or several alkalis, the final emulsion obtained, after integration of the positively charged hydrophobic powder, having all the properties of a cationic emulsion or an emulsion of cationic effect, remaining operational and stable in a strongly alkaline medium, and preserving its versatile coating properties.

Thus, the hydrophobic powders, which carry positive electric charges and are introduced into the emulsions, develop a potential attraction vis-à-vis the negatively charged globules of the emulsion.

This mutual attraction, in view of the principal object of the invention, can be translated into an excess of positive electrical charges for the medium, carried by the hydrophobic powder or powders, such that a versatile breaking effect with cationic effect will be possible.

To attempt to explain the physico-chemical processes which take place, the inventors proposed three hypotheses:

1) the powder grains are adsorbed by the bituminous globules or the like in suspension, of which they erase the negative charges by forming a belt of grains, positively electrically charged;

2) the bituminous globules or the like are attracted and discharged by the grains of hydrophobic powder and group themselves about each other in a positively charged belt;

3) the grains of hydrophobic powder, because they repel water, are distributed mechanically and uniformly in the emulsion and become active only upon contact with the supports, such as the granulates, adapted to be coated. Brought into contact with the supports or the acid granulates, they trigger a reaction of the cationic type and the coating or adhesive covering is obtained. Brought into contact with the supports or the basic granulates, the emulsion continues to function as an anionic emulsion which carries an electric charge opposite that of the granulates or other basic supports and the conditions of coating or adhesive covering are also fulfilled. In this latter case, the presence of the hydrophobic powder can only affect the breaking.

In all three mentioned cases, the conditions for coating and covering that are correct and useful are favorable.

It has been determined that the conditions for success, so as to transform an anionic emulsion into an emulsion with universal effect, particularly cationic, with the aid of hydrophobic powders or pigments, can be summarized by the conditions described hereafter.

Thus, the granulometry of the globules of the basic anionic emulsion, according to the above, does not need to be pursued to too fine an outcome to be effective. Thus, the developments which follow, show that it can be more advantageous to treat an emulsion whose spheroidal globules of bitumen or the like in suspension have a mean diameter greater than 1 $\mu$m and preferably of the order of about 5 $\mu$m.

By contrast, the powders are preferably as finely divided as possible, for example into grains with a mean diameter less than or equal to about 0.2 $\mu$m, preferably about 0.1 $\mu$m.

Departing from these figures, it can be estimated that for a given mass of globules of bitumen of a diameter of 5 $\mu$m, by introducing the same volume of hydrophobic powder whose grains have only 0.1 $\mu$m diameter, there would be obtained a number $50^3$ times greater of grains relative to the number of globules of bitumen. By adding only 1% of this powder relative to the volume of emulsion, there remains an order of magnitude of 1000 grains of hydrophobic powder, charged with a maximum positive electric charge, per bituminous globule, which is quite sufficient to erase the negative charge and to surround with a mantle of positive electric charges each of said globules.

Tests carried out by the inventors thus show that 1% of Spanish white, hydrophobic according to the formula: 50 g of dry powder +2.5 g of $FeSO_4 7H_2O$ in aqueous solution of 25% +0.5 g oleic acid, relative to the volume of emulsion, suffices to transform the latter into a strongly active emulsion, with a universal coating capacity.

The hypotheses stated above, emphasized by the preceding example, permit orienting the elaboration of formulations of emulsions according to the invention toward a suitable definition and determination, whilst tolerating wide tolerances.

As to the passage of the grains of hydrophobic powder through the external aqueous phase of the emulsion and their uniform distribution in the emulsion, it suffices that, in the course of or following the introduction of the positively charged hydrophobic powder, the emulsion will be agitated in a relatively energetic manner.

Contrary to the preconceived notions of those skilled in the art, the preceding operations take place in a strongly alkali medium, whilst the cationic emulsions, sometimes called "acid emulsions", are known to be effective only in acid medium.

This unexpected behavior could have its explanation in the fact that, in the course of the process according to the invention, there takes place, in addition to the chemical phenomena, a physical phenomenon of adsorption of micrograms of a hydrophobic powder, encircling the bituminous globules or the like in suspension in the emulsion. That this phenomenon is possible at a high degree of alkalinity, is a new and surprising discovery and raises the possibility of introducing positive electrical charges into an anionic emulsion, negatively charged, without the emulsion being destroyed thereby. However, a positive charge of the bitumen or of a similar compound, in its emulsion corresponds to the definition of a cationic emulsion.

It should be noted that the greater the remainder of the positive charge, after compensation with the negative charge of the bitumen or of the similar suspension, the greater will be the adhesive breaking power of this emulsion in contact with acid supports, as silicas for example, and this regardless of the degree of moistness.

Even more remarkable is the fact that this emulsion, which owes nothing to the chemistry of synthesis of cationic molecules, is also suitable to coat and to cover (in the same adhesive manner) the supports, particularly the granulates, basic, such as calcareous granulates for example, by reacting as an improved anionic emulsion.

The emulsion obtained by the process according to the invention is accordingly a new type of emulsion which no longer needs any adaptation to the mineralogical nature of the supports, particularly the granulates, nor of their granular compositions. It is suitable even to many organic supports and can therefore be considered to be versatile.

Thus, the emulsion, particularly of the bituminous type, obtained by the process of preparation according to the invention, consists of a cationic emulsion that is stable even in strongly alkaline media, comprising grains of hydrophobic powder positively charged which can coat the basic or acidic supports, hydrophobic or not, no matter what the degree of moistness.

If, by way of theoretical example, beyond any consideration of practical application, it is sought to coat hydrophobic supports with the versatile emulsion of cationic behavior above, it will be noted that under the influence of the two electrical charges of the same sign, the bitumen is expelled from the emulsion. This bitumen thus becomes a normal hydrocarbon binder which, in contact with hydrophobic supports, bonds adhesively to them. This has been confirmed by different tests carried out by the inventors.

It can be considered that the hydrophobic powder, introduced into the anionic emulsion, causes the globules of bitumen to undergo a type of hydrophobation, which removes them from any consideration of electrical charges and confers a universal adhesive coating and covering capacity on the emulsion according to the invention.

Everything happens as if the hydrophobic powder gives back to the emulsion its coating capacity and transfers its condition of hydrophobicity or hydrophobation to the globules of the emulsion.

Moreover, it has been noted that three parameters must be taken into consideration and followed because of their influence on the evolution of the coated materials, namely:

1) the hydrophobic intensity or potential of the selected powder, 2) the weight of hydrophobic powder to be applied to the emulsion, and, 3) the nature of the selected powder.

Thus, taking for example talc powder, made hydrophobic according to the formula: 100 kg of talc+2 kg of $FeSO_4 7H_2O$ in 25% solution+0.2 kg of olein, results in sufficient hydrophobicity that the basic anionic emulsion becomes cationic, for the very low content of 0.25% of hydrophobic talc.

By maintaining constant the potential for hydrophobicity, obtained by the above formula and by causing to vary its weight in the emulsion, there is observed a breaking which is progressively greater upon increasing the content of hydrophobic powder. Often the content of alkalinity of the emulsion must increase so that during the mixing operation there will be no premature breaking.

As the breaking is adhesive, for sufficient alkalinity contents, a mean formulation, suitable for all cases of coating, is foreseeable.

By causing the intensity of the hydrophobicness or the hydrophobicity to increase, and by maintaining constant the hydrophobic powder content in the emulsion, there will be observed, more particularly for a bituminous emulsion, a behavior comparable to that of a cationic emulsion, adhesively coating the acid granulates.

But the specificity of the emulsion according to the invention is such that it coats and covers also adhesively the basic minerals and other supports, by producing coated materials normally usable and layable. All the nuances of behavior can be imagined and created, which permits attacking the precise problems, such as for example the creation of a cold coated material, with separate grains, which will be layable and rollable as its hot version, which did not seem possible until now with viscous bitumens for hot coating.

Starting from a silicious quarry sand of 0/2 mm, containing more than 12% fines, there is easily obtained a coated material in separate grains, with an emulsion from an acidified bitumen, placed in emulsion by water containing 0.3% and more of NaOH and enriched in a powder of calcium carbonate very finely ground (Spanish white, for example), made hydrophobic dry, according to the formula: 100 kg of powder+5 kg of solution of sodium sulfate $FeSO_4 7H_2O$+0.8 kg of oleic acid. The sand, in a quantity of one ton mixed with 150 kg of emulsion with 50 to 55% bitumen, made hydrophobic with 1% of powder, perfectly and adhesively coats. There could take place, according to the origin of the sand, its granular composition, etc., a too rapid breaking, that takes place so to say during the coating operations. In this condition, the coated material is not rollable. It is necessary either to retard the breaking of the emulsion, without more moistening, or to obtain breaking in the mixture. This latter point will be treated later in the present text.

Knowing that a high alkalinity, up to a pH approaching 14, does not prevent breaking, but only slows it, the prospect of obtaining a coated material of separate grains, layable and rollable as much as its hot version, has arisen in the sense that a retarded breaking must continue for the time of cooling during which a hot coated material remains rollable, to remain also compactable during this period of retarded breaking.

This is achievable, without the need to render the emulsion more alkaline, by adding to the dry or low humidity granulates, turning in the mixer-coater, with the addition of the emulsion, a certain dosage of alkali in solid form (which, otherwise, would have been introduced into the emulsion) such as sodium carbonate $Na_2CO_3$ for example. There results a coated material with separate grains, layable by workers and rollable with suitable means, known in the art. Nevertheless, a long transportation would render it again non-rollable, even hardly manipulable. From this, arises the necessity of producing these coated materials adjacent the work places, which moreover, from a point of view at least of economics, can be advantageous than working from a fixed position.

This manner of proceeding however has risk relative to accidents, which breaking in the mixture avoids.

Thus, in the actual condition of cold coating with emulsions, whilst seeking breaking in the mixer, there is avoided the difficulty, when working with bitumens less viscous than those used in hot coating, which does not correspond to one of the objects sought by the invention.

So that the breaking of the emulsion will be possible in the mixer and the working of the coated material will become possible with the viscous bitumens of hot coating, one of the technical means consists in giving to the bitumen the consistency that it has in the form of its inverse WO (water in oil) emulsion, which will be effected, either in the course of mixing causing coating of the supports, or before, in the form of a bituminous WO emulsion, which remains workable.

One of the known means consists in exceeding the maximum stabilization dose of alkali of the emulsion, preferably by adding this excess to the granulates turning in the mixture. Thus the bitumen becomes the external phase of a WO emulsion whose droplets of water emulsified in the bitumen render this latter malleable and thus rollable. Moreover, a large part of this water included in the bitumen fairly quickly leaves it by syneresis. The rest progressively leaves in the course of a process comparable to the cooling phase of the homologous hot coated material.

Another simple and economic means for transforming an anionic OW (oil in water) emulsion into an inverse WO emulsion, consists in introducing NaCl either before or after the addition of the emulsion to the supports or granulates turning in the mixture for their coating, or in the course of this latter. There is thus obtained a bitumen which holds the water in emulsion, with an apparent viscosity, less than actuality, which renders the coated materials thus obtained transportable and rollable, until under the influence of the syneresis, of compacting and evaporation, the bitumen will be restored to its original viscosity and this without having to be subjected to undesirable alteration.

This is a substantial advantage relative to the undesirable superheating and hot coating and the use of solvents (cutbacks).

Thus the bitumen will have been subjected to beneficial treatments for the cold coating process, without alteration of its original composition, and hence of its intrinsic qualities.

As the rest of the water leaves by natural drying in the form of vapor, it can also have the tendency to condense on the coated surfaces of the binder. But that could not have the result of unconcreteing or of producing its foaming because of dehydrophobation.

For obtaining retarded breaking by an anionic emulsion enriched with a hydrophobic powder or by its inversion in a WO emulsion, the means used by the invention do not depart from the framework of simple chemistry, non-polluting, and with the use of techniques described in the patent applications cited above, dealing with a more gentle hydrophobic technique.

In short, the change of electrical sign of the bitumen, or of a similar compound in suspension, of an anionic emulsion being negative, that of the charge of the hydrophobic powder positive, it is easy, during its becoming hydrophobic, to control the potential of its electric charge so that it will be substantially greater, in absolute value, than that of the bitumen of the emulsion.

It will be noted that the two charges of opposite signs attract and that the microscopic grains of the hydrophobic powder are caused to rejoin the globules in suspension of the emulsion, which gives rise to an absorption and an erasure of the negative charge of the bitumen or of the similar compound.

The grains of hydrophobic powder form a cladding about the globules of bitumen or of the similar compound, which carries a positive charge, remaining from the algebraic sum of the two electrical charges present.

The phenomenon of adsorption does not destroy the emulsions, but confers on them another effect, that of a stable emulsion, of cationic type, in alkali medium, having universal and versatile coating and covering properties.

This emulsion according to the invention has, with granulates of any type, a favorable coating reaction with adhesive breaking. Thus, this emulsion, in contrast to hydrophobic materials known from the mentioned patents, no longer distinguishes as to the nature of the materials and adhesively coats basic and acidic materials.

Moreover, thanks to the process for preparation according to the invention, it is possible to obtain a type of emulsion with universal coating power without recourse to new chemical products.

Thus, the powders being very finely divided, made hydrophobic at variable positive electric charges, have been made introducible into anionic emulsions, without breaking them, thereby creating a new type of emulsion which, in a general manner, adhesively coats all the supports, whether bearing a positive or negative electrical charge.

Thus, the physical act which constitutes the introduction of hydrophobic powder or pigment into an emulsion, permits avoiding any new chemistry to arrange the effects of encountering electrical charges at the interface of the binder and of the support to be covered.

By the technique of rendering hydrophobic impalpable powders, introducible into emulsions, as described in the present application, a new manner of designing emulsions is provided, whose systematic application to the general field of the technique of fabrication of emulsions, becomes possible.

Although in the present text reference is made more particularly to bituminous emulsions to describe the characteristics, the use and the application of the invention, other fields of application and of use are envisageable, such as for example paints.

It is thus known from: "Chemistry and Technology of Surface Active Agents" of A. M. SCHWARTZ and J. W. PERRY, Dunod 1955, page 490, that in the preparation of aqueous pulps of pigments, as well as in the crushing of these pigments before being dispersed in water, there is often utilized surface active agents, and that the dispersing and moistening agents, used in paints and lacquers, are generally insoluble in water. They can therefore be made hydrophobic.

It is certain that by making hydrophobic these pigments so as to obtain pigment grains in the form of hydrophobic grains positively charged, the behavior of the paints or lacquers will be modified, rendering them more adhesive and universally covering.

Rendering hydrophobic such pigments, obtained by grinding, is no problem. The services they can render in the operation of fireproofing remain to be explored.

It is also reasonable to suppose that these hydrophobic pigments, used as fillers, play the same role of improvement in paints and lacquers, as the hydrophobic powders in the bituminous emulsions for example (see above), particularly as to coating non-hydrophobic supports as described above.

Non-hydrophobic, the pigments perform the function of quasi-inert fillers. Hydrophobic, they actuate wetting and adhesivity of the surfaces to be coated. Their dynamic, measurable, that universal adhesivity accompanies— particularly in their "emulsion" form—is adapted to modify their ordinary paint function to a more effective specialty.

The present invention also relates to materials coated with the emulsions that can be obtained by means of the emulsions described above, in particularly cold coated material obtained by the use of bituminous emulsion described above, on granulates or similar supports, treated or not.

So as to render such a coated material transportable and rollable, there can preferably be used a bituminous coating emulsion in the form of an inverse WO type emulsion, obtained before or during coating, as described above.

As a modification, the coated material obtained can be reheated before its manipulation or its use and be brought to a temperature of about 110° C.

Thus a material coated with the emulsion according to the invention, based on a viscous bitumen, can be rendered transportable and rollable by reheating it to about 110° C., if desired in the drying drum of a hot coating station, without using either the reconstitution tower of the granular skeleton, for weight and coating, nor the dust remover, these installations no longer being necessary and hence being able to be omitted.

Thanks to the invention, it is therefore possible to obtain particularly a versatile emulsion of a new type with cationic behavior and with universal coating power, obtained by the introduction of hydrophobic grains or pigments of very small granulometry (very finely divided) and in a small quantity in an anionic emulsion, without modifying its liquid consistency. There is thus effected a transfer of the properties of hydrophobicity of the solid supports which constitute the mentioned grains and pigments, to globules of emulsion thus conferring on this latter the qualities mentioned above, the hydrophobic powder constituting only a transfer agent for introduction of said properties into said emulsion.

The use of hydrophobic powders and emulsions described above, or of hydrophobic granulates described in French patent application 2 686 811, also permits simplifying greatly the structure of the installations for the production of coated materials.

Thus, FIG. 1 of the accompanying drawings shows, by way of example, the conventional arrangement of a hot coating installation.

This latter comprises particularly a screening tower 1 with its silos, its system of weighing fractions of granulates separately siloed, its installation for metering hot bitumen, its mixer and its system of removal of the hot coated material toward the transport means or storage silos.

a fines removal complex 2.

an elevator 3 for hot granulates toward the hot screening system.

a drying drum 4.

metering silos 5 for the granular fractions from cold granulates of different sizes.

storage silos 6 for the hot coated material.

However, thanks to the technique of cold coating, using particularly the mentioned emulsions, the device for production and laying of bituminous coated materials is no longer constituted by metering silos 5 containing the granulates to be coated, made hydrophobic or not, and having different granulometries, but rather by a temporary storage silo 7 supplied by the metering silos 5 with a mixture of granulates determined as a function of a given granular formulation, by a balance 8 receiving the successive charges from the silo 7, by at least one mixer 9 supplied by the balance 8 and by a metering pump 10 connected to a storage receptacle for the bituminous anionic emulsion, mixed or not with a hydrophobic powder, this as a function of the nature of the granulates and/or of the presence or not of hydrophobic powder in these latter, and by a pouring conduit 11 pouring the coated materials into the container of a transport means 12 (FIG. 2).

Thus, cold coating permits omitting the screening tower 1 and its accessories, the fines removal complex 2, the elevator 3, the drying drum 4 and the storage silos 6.

In the case in which hydrophobic granulates are used, the fluid binder could be anything at all (see on this subject the description of French application 2 686 811).

So as to offer the possibility of producing either cold coated material or hot coated material, in a same installation, the invention also proposes a device for the production and laying of bituminous coated materials, permitting particularly the use of the mentioned coating process, comprising selective supply means for hydrophobic granulates and non-hydrophobic granulates, in bituminous anionic emulsion and in bituminous anionic emulsion with hydrophobic powder added, from the corresponding storage containers 5, 14, 14', 15, 15', at least one mixing means 9 carrying out the coating, followed by or combined with a reheating means 4 for the coated materials, and means 13, 6 for transporting and conveying the coated materials, heated or not, into the container of a transport means 12 (FIG. 3, 3A and 4 of the accompanying drawings).

In modified embodiments shown in FIGS. 3 and 3A, the device or installation for production and laying of cold coated materials is substantially identical to that of FIG. 2 and the production of the cold coated material remains unchanged, except for the conduit 11 which becomes an orientable conduit 13. This latter can take, by rotation, the two positions necessary to dispense the cold coated material, either directly into the container of a transport means 12, or into a reheater, shown here by the drying drum 4 of a hot coating station.

Thus, the cold coated materials obtained in a mixing means 9 placed at the top of the reheating means 4, to which it is connected by an orientable conduit 13 which, in a first position, pours the cold coated material into the reheating means 4 and, in a second position, pours the cold coated material into the container of a transport means 12.

The coated material travels to the reheater and passes, either to a transport means 12, or into storage silos 6, the same for example as those for hot coating.

This compromise has the advantage of combining in itself the advantages of cold coating with emulsions by taking advantage of those in the nearly hundred year old technique of hot coating.

It is deemed advantageous, at least in the first instance, to connect the integral cold coating (FIG. 2) to a simplified hot coating (FIGS. 3 and 3A) for the following reasons:

a) The fairly strict limits are avoided required by a controlled breaking which would be necessary to ensure sufficient delay for the transport and use of the coated material.

b) There can be used until completely amortized all the transport and emplacement material which now serves for conventional hot coating.

c) The devices of FIGS. 3 and 3A permit as desired carrying out integral cold coating, according to FIG. 2, by disconnecting the reheater, which permits, in down time, the adjustments from the hot, according to FIGS. 3 and 3A.

This compromise raises the bituminous coating processes to a degree of generalization never before attained.

The good usage of the mentioned emulsion according to the invention permits thus the suppression of all pollution and gives rise to a great simplification of the conventional hot coating station, because the cold coated material, produced in a simple mixer, immersed in its water from breaking the emulsion and in that provided by the granulates from their storage, no longer needs to be dried, but simply to be reheated with the coated material, at a minimum operating temperature.

Because of this, when using for example as a reheater, the drying drum 4 of a conventional hot coating station (FIGS. 3 and 3A), there will no longer be needed a fines removal nor a formula to be reconstituted, whilst enjoying the delay of transport and use well known for hot coating. Moreover, there remains the great advantage of being able to use and to amortize the locality for transporting and laying coated materials.

As a result, the invention also has for its object a process which, starting from any cold coated material, based on viscous bitumens, as used in hot coating for example, permits obtaining, by reheating without drying, a useful hot coated material and laying it, at about 100° C.

A reheating drum 4 better adapted to this process, comprises instead of the usual mixing devices, a wear and insulation tube 16, for example of steel and having a smooth internal surface, whose diameter is slightly less than the internal diameter of the drying drum 4.

The tube 16 is of a diameter such that it leaves several millimeters empty between the drum itself and this wear and insulation tube, this latter being moreover easy to replace.

In addition to a better concentration of heat radiating to the product to be reheated, recovered by this insulating device, the drum cannot be crushed and the materials in the course of reheating slide toward the outlet, being driven by a rhythmic balancing movement which, at each instance, modifies the orientation of each granule before the flame. This fact and the simultaneous presence of water and of bitumen, avoid any undesirable effect of the flame on the bitumen. A protective screen would be a useless precaution.

But the most rational reheating means consists in the use of microwaves, which completely eliminate any pollution from $CO_2$, already substantially reduced by the invention.

According to a preferable embodiment of the invention, leading to a more compact structure of the production device, it can be provided that the mixing and reheating means are assembled in a single heating mixing drum 4 which, in its upstream portion, in the inlet region for the granulates and the emulsion, carries out the coating with complete breaking and to which, in its downstream portion, delivers a coated material at a given temperature, particularly greater than about 100° C., after progressive reheating of the coated material in the course of its transfer in the drum 4 (FIG. 4).

Not only has this coating station or device become more compact, but also it has become more useful, but above all cleaner and more economical.

Beginning with an example of cold coating, followed by reheating to 100° C., an energy balance which is due to the presence of water, by comparing with a conventional hot coating and the new hot coating made possible by the invention, permits appreciating the energy saving of this new hot coating process.

To this end, if it is considered that one ton of untreated granulates carries 40 liters of water in a conventional hot coating, to eliminate this, it is necessary to evaporate it, which requires, in round numbers, 40×600=24,600 kcal. For the same ton of granulates, first cold coated according to the invention, it can be considered that it carries 80 liters of water to the reheater whose temperature elevation to 100° C. will consume about 80×100=8,000 kcal, hence only a third of that consumed by conventional hot coating.

This appreciable energy saving is accompanied by complete lack of dust pollution, by an inhibition of segregation and by a simplification of the apparatus described above.

Moreover, less $CO_2$ is expelled into the environment.

Furthermore, with the simple devices disposed in the transport path of the cold coated material toward the reheater, there can be eliminated a large part of this water, which gives an even more favorable balance.

This new approach to hot coating permits not only rendering this technique unpolluting, but greatly simplifies the present devices and saves parking lots and work yards which exist and which normally accompany conventional hot coating.

Furthermore, this new coating procedure can also be considered as being an improvement of the different cold coating techniques, because of the avoidance of sensitive control of breaking.

There is therefore a mutual enrichment, both for the hot coating technique when there is applied thereto the advantages of cold coating, and for the so-called "cold" coating when the advantages of hot coating are applied to it.

Designed for example as a mobile compact station, the station or coating device with double effect which results from the preceding considerations, replaces entirely the present conventional hot coating station, but can render to cold coating this immense surface of avoiding the delicate phase of controlled breaking of the cold coating, by reheating it.

Until the drawbacks which were considered to attend cold coating in its final transport and laying are surmounted in practice, there could be applied thereto reheating according to the mentioned coating process.

As soon as integral cold coating has achieved the same security as hot coating, the reheater can be disconnected and integral cold coating carried out, without having need to change the coating station, which, in case of difficulty, can immediately switch to hot.

It should also be noted that the coated material moving in the insulation and wear tube 16 is no longer broken up in the flame and advances by a rhythmic pendular movement toward the outlet of the drum 4, the particles of this coated material being in constant movement of return and automatic cleaning and thus having no rest position before the flame, which would likely overheat the bituminous binder.

There is thus obtained for cold coating, as for hot coating, a continuous production which omits the preliminary weighing and mixing apparatus figuring in FIGS. 2, 3 and 3A.

FIG. 4 of the accompanying drawings shows an example of these possible arrangements. The granular formulation is comprised by the metering silos 5 and the ordinary silos 14, whilst the silo 14' can contain a hydrophobic powder. The emulsion vats 15 and 15' can contain, one a simple anionic emulsion and the other the same emulsion but rendered versatile by the introduction of a hydrophobic powder. The mixing drum 4 is provided with the insulation and wear tube 16.

The production of the cold coated material, as that of the hot coated material, is carried out continuously, the burner not lighted for cold coating and the burner lighted for hot coating. In this latter case, the burner is adjusted such that the outlet temperature for the coated material reaches or exceeds 100° C., without pursuing the elimination of water by evaporation.

Two possibilities are available to the user: either working with a simple anionic emulsion, from the vat 15 and with the hydrophobic powder from the silo 14', or the versatile emulsion from the vat 15'.

The continuous cold coating is mixed by the drum from which it exits in a condition either of retarded breaking, suitable for the distance for transportation, laying and compacting, or of complete breaking with the form of a WO emulsion.

Hot coating takes place in the same manner, but with the burner lighted, with the advantage that the complete breaking is accelerated by the heat, without which it would be necessary to cause the evaporation of the water.

The hot coating can be loaded directly into the transport means 12 or held in the silos.

It is however to be recalled that the processes of rendering hydrophobic can, in another manner, which is to say without recourse to reheating, ensure good integral cold coating which becomes practically independent of the transport distances.

Thus, no matter what granular formulation, no matter how finely divided, can be coated by an anionic emulsion superstabilized or not by alkali, of which sodium carbonate $Na_2CO_3$ is the most suitable. By stabilizing maximally for a given content of hydrophobic powder, the breaking can be corresponding retarded, so that it is necessary to intervene by suitable means to effect it. This means consists in a product to be added at the time of laying the grout or the coated material. Thus the grout and the coated material can be transported to no matter what distance and can undergo no matter what holding time. At the time of their laying, a product capable of effecting or modulating breaking is added.

The best breaking vectors are precipitators of anionic emulsifier, this latter being generally added to the bitumen by refineries to augment the acid index of the bitumen. Magnesium sulfate $MgSO_4$ is preferably used as a breaking salt. It has the advantage of being adapted to be added in the form of a salt or in aqueous solution, without the breaking reaction destroying the hydrophobic effects which continue to act by producing an adhesive and covering coating.

This possibility of transport to long distances with the possibility of unlimited holding time and the choice at the moment of the rupture of the emulsion, are certain advantages relative to the possibilities of hot coating which cannot be finally arranged except during a limited cooling time. But at the same time there is lost the advantage of the use of transport means, laying means, etc. and the hot coating materials.

Thus, because of vibrations during transport of hot coated materials whose emulsion has not been broken, there is the risk of flow of the emulsion on the ground and consequently a modification of the formulation.

Moreover, the manipulation of such coated materials is polluting. Hence their laying requires other apparatus than open trucks, finishers, etc. required for hot coating.

The user who wishes to use only integral hot coating, must either invert the OW emulsion to a WO emulsion, sufficiently stable to support transportation and transshipment, or change the technique and organize the transport in rotating vats, such as those for transporting concrete.

This latter transport means solves best these problems and permits conserving completely the advantage of the production of coated materials not connected to a transport distance and with unlimited holding time, by preserving the advantage of the decision of the moment for breaking the emulsion.

These transporters can pour directly their content onto the space to be covered, or in the form of grouts or coated materials, these latter being profiled and compacted as concrete. The breaking means is introduced into the coated material to be poured on the discharge ramp of the vat or else, particularly as to the grouts, spread on the surface to be covered, just before laying.

According to a supplemental characteristic of the invention, shown in FIG. 5 of the accompanying drawings, the transport means 12 is provided with a pouring and spreading unit of adjustable size comprising a concrete pump 18, this latter being connected with a projection apparatus 19 of the breaking and adhesivity vector, which ensures at all times a flow proportional to that of the concrete pump. The flow rate of the projection apparatus of the vector for breaking and adhesion is preferably adjustable to achieve an adjustable speed of breaking by the variation of the ratio of these flow rates, this connection, electronically controlled, ensuring also, that at each beginning of flow from the concrete pump, the projection apparatus of the breaking and adhesion vector will have dispensed a useless jet on the ground.

Among these breaking vectors, given for example in the mentioned patents, there is preferred magnesium sulfate $MgSO_4$ which forms an insoluble salt with the anionic emulsifier to act as the inversion agent of the emulsion.

Alkali sodium sulfate $Na_2SO_3$, for example, is not a precipitant for the anionic emulsifier. It permits causing and modifying the breaking in another effective manner.

The risks of flooding of the pump 14 are avoided because the breaking vector is pulverized on the pouring of the coated material only after its exit from the delivery nozzle of the pump 14 onto the area to be coated where it will be profiled, hence agitated, according to the processes in use for concrete.

This connection is matched to the condition, electronically effected, that the concrete pump 18 cannot begin to dispense until the pump 19 has projected its first useless jet onto the ground. In this way it is ensured that the breaking vector will have acted on all of the mass of the coated material.

To give an idea of the order of magnitude of the flow rates in the case of the use of magnesium sulfate $MgSO_4$ as breaking vector, in the form of its 25% aqueous solution for example, the quantity necessary for rapid to very rapid breaking, is of the order of 0.4% relative to the weight of the coated material. For laying 100 tons of coated material, it is therefore necessary to have about 300 liters of this solution which will be finely atomized.

The speed of breaking can be modulated by variation of the flow rate of the $MgSO_4$ solution by means of a loaded valve mounted on the discharge conduit of the pump 19, carried in the hand of the operator.

For grouts and thin coatings, the spreading of the breaking vector on the surfaces to be coated, just before spreading, is a possibility which can be offered.

It has been observed that the mixture of an aqueous solution of magnesium sulfate $MgSO_4$ with a hydrophobic powder gives rise to a fairly homogeneous milky liquid which pours only slowly, which is not the case of a mixture of sodium sulfite $Na_2SO_3$ with a hydrophobic powder. In this latter case, the products do not mix and remain nicely separated.

The observation of the evolution of a coated product with an anionic emulsion superstabilized with alkali whose breaking, without the intervention of a special vector would never take place, shows that the rupture vector $MgSO_4$, associated with a hydrophobic powder, in the form of a milky liquid, would be capable of giving to the coated material both adhesion, covering and simultaneous breaking, with possible modulations, by the addition of a variable amount of this combination of $MgSO_4$/hydrophobic powder with the coated material at the moment of its laying.

Laboratory tests have confirmed this as possible and desirable.

A good mixing ratio of $MgSO_4$ 25% solution with hydrophobic powder is 10:1. Here again all the modifications are possible, and it is possible to work solely with the simpler anionic emulsion, superstabilized with alkalis and the combination of $MgSO_4$/hydrophobic powder in aqueous solution or in solid form.

It is a more flexible generalization, going still further in effectiveness than the versatile emulsion and which represents a good solution for coated materials emplaced with the aid of a concrete pump.

Thus the user remains completely master of the production of the work sites because the laying of the coated material and the breaking of the emulsion can take place at his pleasure, which is a considerable advantage over hot coated material which are subject to progressive cooling and which limits their use.

Of course, the invention is not limited to the described embodiments. Modifications remain possible, particularly as to the construction of the various elements, or by substitution of technique equivalents, without thereby departing from the scope of protection of the invention.

I claim:

1. Process for the preparation of an emulsion having improved coating and covering properties, comprising introducing into an anionic emulsion that is finished or in the course of production, at least one powdered hydrophobic mineral or organic powder of positive electrical charge, in a quantity at least sufficient to confer on said emulsion a cationic behavior and coating properties.

2. Process for preparation according to claim 1, characterized in that the hydrophobicity of the positive electrical charge of the powder grains is obtained, preliminarily to its introduction into the emulsion, by the action of a metallic salt and of a long chain organic acid.

3. Process for preparation according to claim 2 characterized in that the metallic salt consists of a ferrous salt or of a metallic acid salt, in aqueous solution, the organic acid being adapted to consist of a fatty acid.

4. Process for preparation according to claim 1, characterized in that in the course of or following the introduction of the positively charged hydrophobic powder, the emulsion is agitated in a relatively vigorous manner.

5. Process for preparation according to claim 1, characterized in that the mean diameter of the grains of the hydrophobic powder is at least about 10 times less than that of globules in suspension in the emulsion.

6. Process for preparation according to claim 1, characterized in that the emulsion is present initially in the form of an anionic emulsion stabilized by means of one or several alkalis, the final emulsion obtained, after integration of the positively charged hydrophobic powder, being an emulsion with cationic behavior, remaining stable in a strongly alkaline medium.

7. Process for preparation according to claim 1, characterized in that the emulsion consists in a bituminous emulsion of the OW (oil in water) type transformed, prior to coating the supports or in the course of said coating, into a bituminous emulsion of the WO (water in oil) type, by the introduction of NaCl or of a similar product having inversion capability.

8. Process for preparation according to claim 7, characterized in that globules of bitumen of the emulsion, of spheroidal configuration, have a mean diameter greater than 1 μm, preferably of the order of about 5 μm, and in that the grains of the hydrophobic powder have a mean diameter less than or equal to about 0.2 μm, preferably about 0.1 μm.

9. Emulsion obtained by means of the process of preparation according to claims 1, characterized in that it consists of an emulsion with cationic behavior, stable in a strongly alkaline medium, comprising grains of hydrophobic powder and adapted to coat basic or acid supports, hydrophobic or not, no matter what their degree of humidity.

10. Emulsion obtained by means of the process of preparation according to claim 1, characterized in that it comprises grains of pigment in the form of hydrophobic grains positively charged.

11. Bituminous coated material, characterized in that it is obtained by application of the emulsion according to claim 9 to supports.

12. Coated material obtained by application and breaking of the emulsion according to claim 9 to granulates, characterized in that it is reheated before its manipulation or its use and brought to a temperature of about 110° C.

13. Process for the bituminous coating of any supports by providing a cold coating of the supports by bituminous emulsions, comprising first obtaining a hydrophobic powder of positive electric charge by the conjoint action of a metallic salt soluble in water and a long chain organic acid, then introducing this powder, either into a mass of the supports to be coated, or into a bituminous anionic emulsion and then mixing the supports and bituminous emulsion in a mixer so as to effect coating of the supports with the bituminous emulsion, wherein the emulsion is an anionic emulsion and the powder is a hydrophobic powder of positive electric charge so as to confer on said emulsion a cationic behavior and coating and covering properties.

* * * * *